United States Patent [19]
Yiu et al.

[11] Patent Number: 5,752,077
[45] Date of Patent: May 12, 1998

[54] DATA PROCESSING SYSTEM HAVING A MULTI-FUNCTION INPUT/OUTPUT PORT WITH INDIVIDUAL PULL-UP AND PULL-DOWN CONTROL

[75] Inventors: Hing Leung Yiu, Tsuen Wan, Hong Kong; Jeff Gokinko; Glen Zoerner, both of Austin, Tex.

[73] Assignee: Motorola, Inc., Schaumburg, Ill.

[21] Appl. No.: 440,948

[22] Filed: May 15, 1995

[51] Int. Cl.$^6$ .................. G06F 3/00; G06F 15/78; G06F 1/24
[52] U.S. Cl. .................. 395/827; 395/834; 395/851
[58] Field of Search ................ 395/821, 800, 395/827, 834, 851; 307/465

[56] References Cited

U.S. PATENT DOCUMENTS

| | | | |
|---|---|---|---|
| Re. 34,363 | 8/1993 | Freeman | 307/465 |
| 4,349,870 | 9/1982 | Shaw et al. | 364/200 |
| 4,680,487 | 7/1987 | Kobayashi | 307/475 |
| 5,146,565 | 9/1992 | Blanck et al. | 395/275 |
| 5,226,010 | 7/1993 | Glider et al. | 365/189 |
| 5,237,221 | 8/1993 | Posse | 307/468 |
| 5,315,178 | 5/1994 | Snider | 307/465 |
| 5,396,639 | 3/1995 | Suenaga et al. | 395/800 |
| 5,563,526 | 10/1996 | Hastings et al. | 326/37 |
| 5,596,765 | 1/1997 | Baum et al. | 395/800 |

OTHER PUBLICATIONS

Motorola Inc., 1990, MC68340 Integrated Processor User's Manual, pp. 4-14-4-16, Section 4.2.4.2 "Global Chip-Select Operation".

Intel 8051 Handbook, Document Number:Unknown, Country:Japan, Translation:No, Name:Fig. 3-6 from Intel 8051 Handbook, pp. 47.

Primary Examiner—Thomas C. Lee
Assistant Examiner—Rehana Perveen
Attorney, Agent, or Firm—Daniel D. Hill

[57] ABSTRACT

A data processing system (20) has a multi-function scalable parallel I/O port (44). The I/O port (44) includes a plurality of I/O port circuits (55, 56) coupled to I/O terminals (67, 77). The I/O port (44) can multiplex two functions onto one terminal (67,77). One function is an I/O function and the other function is function under the control of an internal module (22, 24, 26, 32) connected to the terminal (67, 77). Each I/O port circuit (55, 56) has either a pull-down circuit (68) or a pull-up circuit (78) coupled to the terminal (67, 77). The pull-up and pull-down circuits (78, 68) are controllable using a control register (81, 82). The pull-up and pull-down circuits (78, 68) for each terminal (67, 77) can be individually selected, and function whether the I/O port (44) is selected or deselected.

17 Claims, 2 Drawing Sheets

5,752,077

1

DATA PROCESSING SYSTEM HAVING A MULTI-FUNCTION INPUT/OUTPUT PORT WITH INDIVIDUAL PULL-UP AND PULL-DOWN CONTROL

FIELD OF THE INVENTION

This invention relates generally to data processing, and more particularly, to a data processing system having a multi-function scalable parallel input/output port.

BACKGROUND OF THE INVENTION

Some data processing systems are designed to be general purpose and are used for wide range of applications. The amount of computing power required of the general purpose data processing system varies with the application. For example, if the data processing system has a 16bit address bus, some applications may require only 8 bits of the address bus, and the other 8 bits remain unused. An external load resistor is used to couple the address pins to a power supply voltage terminal, such as ground, to ensure the pins do not float and power up a predetermined logic state. The address pins cannot be reused because of the external load resistors. Also, the external load resistors provide an additional load on the data processing system, increasing power consumption.

Many applications require a large number of input/output (I/O) port pins for transmitting and receiving signals external to data processing system 20, such as keyboards, external memory, DSPs (digital signal processors), modems, and the like. The number of I/O pins on the package is increased to accommodate the demand for I/O ports, increasing the pin count, size of the package, and expense of the general purpose data processing system, while many of the pins are unused, as discussed above.

DESCRIPTION OF A PREFERRED EMBODIMENT

Generally, the present invention provides a data processing system having a multi-function, scalable, parallel input/output (I/O) port. The I/O port includes a plurality of I/O port circuits coupled to I/O terminals, or pads. The multi-function I/O port can multiplex two functions onto one pad. One function is an I/O function and the other function can be a function of an internal module connected to the pad. Each I/O port circuit has a reset/startup circuit comprising either a pull-up circuit or a pull-down circuit coupled to the I/O pad. The pull-up and pull-down circuits are controllable by writing control bits of a predetermined logic state into a control register. The pull-up and pull-down circuits for each pad can be individually selected, and operate whether the I/O port is selected or deselected.

The multi-function, scalable, I/O port effectively increases the number of parallel I/O terminals without increasing the number of pins on a package containing the data processing system. Also, the multi-function, scalable, I/O port reclaims the use of pins for other functions that were previously only used at startup or reset. In addition, power consumption is reduced because the external load resistors are eliminated.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status.

Figure 1:
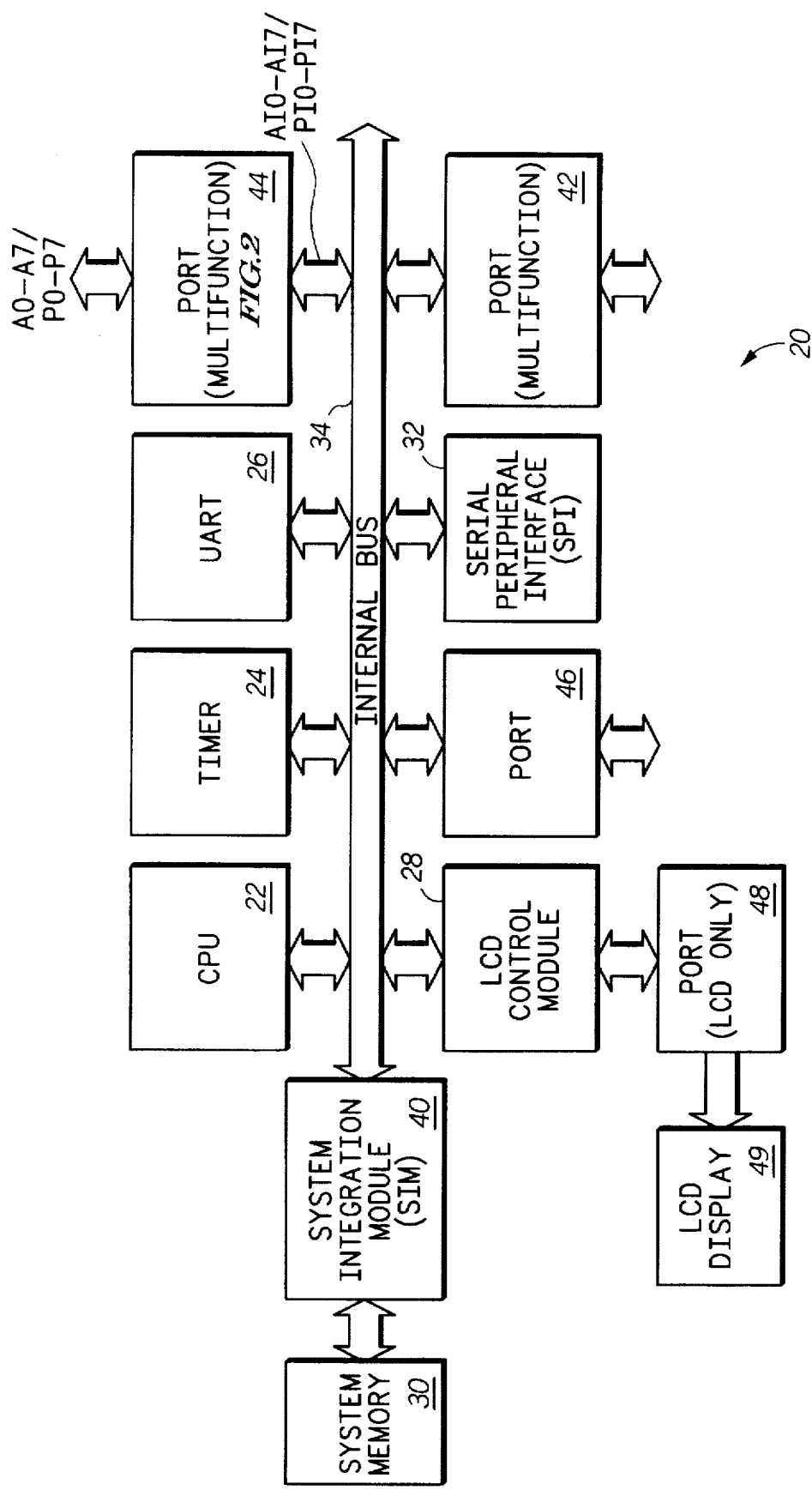
FIG. 1 illustrates, in block diagram form, an embodiment of a data processing system in accordance with the present invention.

The present invention can be more fully described with reference to FIGS. 1-2. FIG. 1 illustrates, in block diagram form, data processing system 20 in accordance with the present invention. Data processing system 20 includes central processing unit (CPU) 22, timer 24, universal asynchronous receiver/transmitter (UART) module 26, LCD control module 28, serial peripheral interface (SPI) 32, internal information bus circuit 34, system integration module (SIM) 40, and multi-function I/O ports 42, and 44, and I/O ports 46 and 48.

SIM 40 is connected to internal bus circuit 34 and can receive and transmit signals to data processing system 20 by way of internal bus circuit 34 or to circuits external to data processing system 20. System memory 30 is connected to data processing system 20 via SIM 40. SIM 40 can receive and transmit signals to any of the other modules connected to internal bus circuit 34. Multi-functional ports 42 and 44 can receive and transmit signals external to data processing system 20 and are connected to internal bus circuit 34. I/O ports 46 and 48 can receive and transmit signals external to data processing system 20 and are connected to internal bus circuit 34. Ports 42, 44, and 46 are multi-function, scalable, parallel bi-directional I/O ports for transmitting and receiving signals external to data processing system 20, such as keyboards, external memory, DSPs (digital signal processors), modems, and the like. I/O port 44 has bi-directional terminals connected to internal bus circuit 34 for transmitting or receiving signals labeled "AI0-AI7/PI0-PI7", and bi-directional terminals for transmitting or receiving signals labeled "A0-A7/P0-P7" and is illustrated in more detail in FIG. 2. In the illustrated embodiment, signals A0-A7 represent address signals provided to an external memory, and signals P0-P7 are data signals from one of the modules of data processing system 20. Port 48 is for transmitting display data to the LCD display 49. I/O ports 42, 44, 46, and 48 may be coupled to integrated circuit pins, pads, or other types of terminals for transmitting and receiving signals external to data processing system 20. SIM 40 can receive and transmit signals to any of the other modules connected to internal bus circuit 34.

CPU 22 is connected to internal bus circuit 34 and may receive and transmit signals to each of the other modules connected to internal bus circuit 34. CFU 22 may optionally receive and transmit signals external to data processing system 20 by way of SIM 40. The CPU is usually responsible for receiving, interpreting, and executing the software instructions used to control the data processing system. UART 26 is connected to internal bus circuit 43. UART 26 supports asynchronous serial communications with external devices such as modems and other data processing systems at standard baud rates.

SPI 32 can receive and transmit signals external to data processing system 20 and with other modules via internal bus circuit 34. SPI 32 is a master/slave serial peripheral interface for communicating with external devices such as analog-to-digital converters, non-volatile memory devices, and other data processing systems. System memory 30 is bi-directionally connected to SIM 40. System memory 30 is a conventional memory unit comprising an array of static random access memory cells organized in rows and columns. System memory 30 may be external to data processing system 20, or may be on the same integrated circuit as data processing system 20. In the illustrated embodiment, system memory 30 is an external memory unit. Timer 24 is connected to internal bus circuit 34, and communicates with other modules of data processing system 20 via internal bus circuit 34. LCD control module 28 is connected to internal bus circuit 34. LCD control module 28 provides control functions for refreshing an LCD display screen connected to output port 48.

The embodiment of data processing system 20 which is shown in FIG. 1 illustrates one particular microprocessor within a family of microprocessors. Because microprocessors in the same family generally have a plurality of differing on-board peripherals, or modules, FIG. 1 illustrates only one embodiment of data processing system 20. Alternate embodiments of data processing system 20 may have fewer, more, or different on-board peripherals than those illustrated in FIG. 1.

Figure 2:
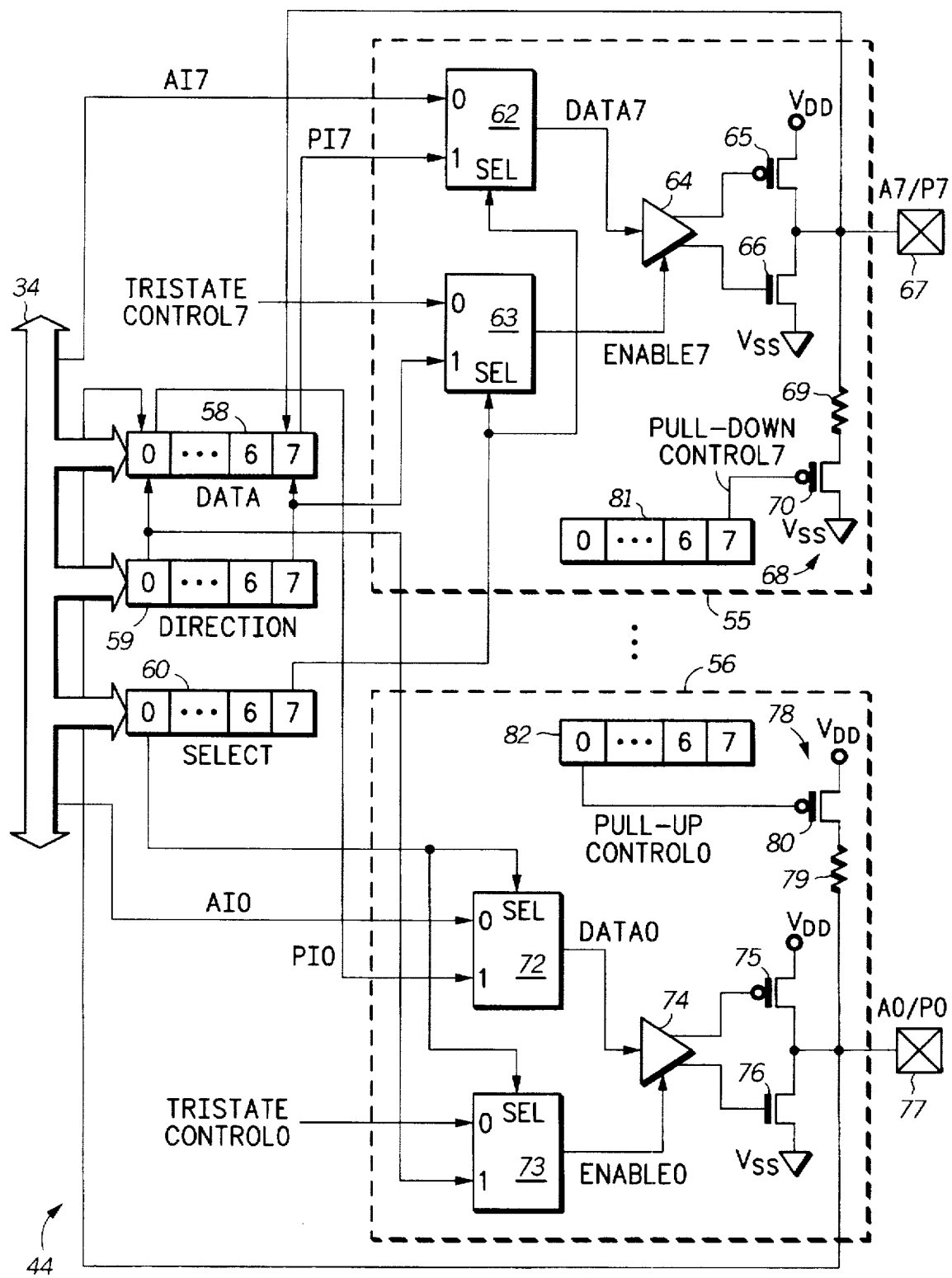
FIG. 2 illustrates, in partial block diagram form and partial schematic diagram form, a portion of an input/output port of the data processing system of FIG. 1 in accordance with the present invention.

FIG. 2 illustrates, in partial block diagram form and partial schematic diagram form, I/O port 44 of the data processing system of FIG. 1 in accordance with the present invention. I/O port 44 includes a plurality of I/O port circuits 30 represented by I/O port circuits 55 and 56, and registers 58, 59, 60, 81, and 82. I/O port circuit 55 illustrates an I/O port circuit including a pull-down circuit, and I/O port circuit 56 illustrates an I/O port circuit including a pull-up circuit. I/O port 44 may include any number of parallel I/O port circuits having pull-up circuits, pull-down circuits or any combination of pull-up or pull-down circuits as required by the data processing system. I/O port circuit 55 includes multiplexers 62 and 63, buffer circuit 64, P-channel output transistor 65, N-channel output transistor 66, and pull-down circuit 68. Pull-down control circuit 68 includes resistive element 68 and pull-down N-channel transistor. I/O port circuit 56 includes multiplexers 72 and 73, buffer circuit 74, P-channel output transistor 75, N-channel output transistor 76, and pull-up circuit 78. Pull-up circuit 78 includes P-channel transistor 80 and resistive element 79.

In I/O port circuit 55, multiplexer 62 has a first input terminal, labeled with a "0", connected to internal bus circuit 34 for receiving a signal labeled "AI7", a second input terminal, labeled with a "1", connected to an output terminal of register 58 for receiving a signal labeled "PI7", a control terminal, labeled as "SEL", connected to an output terminal of register 60, and an output terminal for providing a data signal labeled "DATA 7". Multiplexer 63 has a first input terminal, labeled with a "0", for receiving a tristate control signal labeled "TRISTATE CONTROL 7", and second input terminal, labeled with a "1", connected to an input terminal of register 58 and to an input terminal of register 59, a control terminal, labeled as "SEL", connected to an output terminal of register 60, and an output terminal for providing an enable signal labeled "ENABLE 7". Buffer circuit 64 has an input terminal connected to the output terminal of multiplexer 62, a control terminal connected to the output terminal of multiplexer 63 for receiving an enable signal labeled "ENABLE 7", and first and second output terminals. Buffer circuit 64 is a conventional buffer circuit. P-channel transistor 65 has a first current electrode (source) connected to a power supply voltage terminal labeled "$V_{DD}$", a control electrode(gate) connected to the first output terminal of buffer circuit 64, and a second current electrode (drain) connected to input/output terminal 67 for providing an output signal labeled "A7/P7". N-channel transistor 66 has a first current electrode (drain) connected to input/output terminal 67, a control electrode (gate) connected to the second output terminal of buffer circuit 64, and a second current electrode (source) connected to a second power supply voltage terminal labeled "$V_{SS}$". Resistive element 69 has a first terminal connected to I/O terminal 67, and a second terminal. N-channel transistor 70 has a first current electrode (drain) connected to the second terminal of resistive element 69, a control electrode (gate) for receiving a pull-down control signal labeled "PULL-DOWN CONTROL 7" from register bit field 81, and a second current electrode connected to $V_{SS}$.

In I/O port circuit 56, multiplexer 72 has a first input terminal, labeled with a "Q", connected to internal bus circuit 34 for receiving a signal labeled "AI0", a second input terminal, labeled with a "1", connected to an output terminal of register 58 for receiving a signal labeled "PI0", a control terminal, labeled as "SEL", connected to an output terminal of register 60, and an output terminal for providing a data signal labeled "DATA 0". Multiplexer 73 has a first input terminal, labeled with a "0", for receiving a tristate control signal labeled "TRISTATE CONTROL 0", and second input terminal, labeled with a "1", connected to an input terminal of register 58 and to an input terminal of register 59, a control terminal, labeled as "SEL", connected to an output terminal of register 60, and an output terminal for providing an enable signal labeled "ENABLE 0". Buffer circuit 74 has an input terminal connected to the output terminal of multiplexer 72, a control terminal connected to the output terminal of multiplexer 73 for receiving an enable signal labeled "ENABLE 0", and first and second output terminals. Buffer circuit 74 is a conventional buffer circuit. P-channel transistor 75 has a first current electrode (source) connected to $V_{DD}$, a control electrode(gate) connected to the first output terminal of buffer circuit 74, and a second current electrode (drain) connected to I/O terminal 77 for providing an output signal labeled "A0/P0". N-channel transistor 76 has a first current electrode (drain) connected to I/O terminal 77, a control electrode (gate) connected to the second output terminal of buffer circuit 74, and a second current electrode (source) connected to $V_{SS}$. Resistive element 79 has a first terminal connected to I/O terminal 77, and a second terminal. P-channel transistor 80 has a first current electrode (drain) connected to the second terminal of resistive element 79, a control electrode (gate) for receiving a pull-up control signal labeled "PULL-UP CONTROL 0", and a second current electrode (source) connected to $V_{DD}$.

I/O terminals 67 and 77 can be any type of input/output terminal for transmitting or for receiving a signal, such as a pin, a metal pad, or the like. Multiplexers 62, 63, 72, and 73 are conventional multiplexer circuits. The tristate control signals may be provided by a system control register (not shown) or other control means.

Multi-function I/O port 44 can multiplex two functions onto one pad, or pin. One function is an I/O function and the other function can be a function of an internal module connected to the pad, such as UART 26, or SPI 32. For example, the illustrated embodiment, I/O port 44 may multiplex address information from internal bus 34 during an address operating mode, and I/O information from UART 26 an I/O operating mode. Each I/O port circuit of I/O port 44 may have either a pull-up circuit or a pull-down circuit coupled to its respective I/O terminal. Pull-up circuit 78 is activated by writing a logic high control bit into pull-up register bit field 82 and pull-down circuit 81 is activated by writing a logic high control bit into pull-down register bit field 81. The pull-up and pull-down circuits for each pad can be individually selected, and operate whether the I/O port is selected or deselected.

Pull-down circuit 68 and pull-up circuit 78 function to set the I/O terminals 67 through 77 to a predetermined logic state, to avoid floating, such as during start up or reset of data processing system 20. This e compatibility with an external device, and ensures that the external device, such as a memory connected to I/O port 44, receives a known logic state during start up. Pull-down circuit 68 and pull-up circuit 78 eliminate the need for external pull-down and pull-up resistors but still allow data processing system 20 to power up, or reset, selected pins to a predetermined logic state. During reset, if necessary, I/O port 42 and I/O port 44 can be selected as input ports to prevent contention with the pull-down and pull-up circuits. After start up or reset, I/O ports 42 and 44 are configured for parallel input signals or for output signals.

Direction register bit field 59 includes bits 0–7. Note that the number of bits in each of the register bit fields corresponds to the number of parallel I/O terminals in I/O port 44. In other embodiments, the number of I/O terminals may be different and is not important for describing the invention. Direction register bit field 59 control the direction of data flow at output terminals 67 and 77. When bits of direction register bit field 59 are set at logic high states, corresponding data bits are provided from data register bit field 58 to the corresponding I/O terminal. When bits of direction register bit field 59 are logic low, the corresponding I/O terminal receives data from an external device. At reset, bits 0–7 of direction register bit field 59 are logic low.

Select register bit field 60 includes bits 0–7. Select register bit field 60 control the source of data provided to the I/O terminals. When the bits of select register bit field 60 are logic low and the I/O terminals are functioning as output terminals, signals AI0–A17 are provided to the I/O terminals. When the bits of select register bit field 60 are logic high, and the I/O terminals are functioning as output terminals, signals PI0–PI7 are provided to the I/O terminals. At reset, bits 0–7 of select register bit field 60 are reset to logic highs.

Data register bit field 58 includes bits 0–7. Data register bit field 58 is a conventional read/write general purpose register and stores the data that is provided to the output terminals 67 and 77 when the corresponding bits of direction register bit field 59 and select register bit field 60 are set at logic high states. Data register bit field 58 stores the data is received at the output terminals when the corresponding bits of direction register bit field 59 are logic high and the corresponding bits of select register bit field 60 are logic low. At reset, bits 0–7 of data register bit field 58 are reset to logic lows.

As an example, during the address operating mode, I/O port circuit 55 is configured as an output port. Bit 7 of direction register bit field 59 is a "don't care", bit 7 of select register bit field is a logic low, the logic state of data register bit field 58 is "don't care", and address signal A17 is a logic high, then address signal A17 is provided to the "0" input terminal of multiplexer 62. A logic high signal DATA 7 is provided to buffer circuit 64. The logic low bit 7 of select register bit field 59 causes a logic causes the "0"input terminals of multiplexers 62 and 63 to be provided to the output terminals of multiplexers 62 and 63, respectively. Tristate control 7 is a logic high, causing a logic high enable signal ENABLE 7 to enable buffer circuit 64. A logic low output signal from buffer circuit 64 causes P-channel transistor 65 to be conductive and N-channel transistor 66 to be substantially non-conductive, driving a logic high output address signal A7 to I/O terminal 67. Bit 7 of pull-down register bit field 81 is a logic low, causing N-channel transistor 70 to be substantially non-conductive, disabling pull-down circuit 68.

In the address mode just described, I/O port circuit 56 functions like I/O port 55, except that bit 0 of registers 58, 59, and 60 controls the data flow instead of bit 7. Also, I/O port circuit 56 includes a pull-up circuit instead of a pull-down circuit as another embodiment of I/O port 44. Typically, an I/O port will have either a pull-up circuit or a pull-down circuit coupled to each parallel I/O terminal of the port.

If I/O port circuit 55 is configured as an output port of the I/O operating mode, bit 7 of direction register bit field 59 is a logic high, bit 7 of select register bit field is a high, the logic state of bit 7 of data register bit field 58 is a logic high, and address signal AI7 is a "don't care". The logic high bit 7 of direction register bit field 59 places data register bit field 58 is a read mode. Assume that signal P17 is a logic high and is read from data register bit field 58 to the "1"input terminal of multiplexer 62. The logic state of signal DATA 7 corresponds to the logic state of signal P17 and is provided to buffer circuit 64. The logic high bit 7 of select register bit field 59 causes a logic high enable signal ENABLE 7 to be provided by multiplexer 63 to enable buffer circuit 64. An output signal from buffer circuit 64 causes P-channel transistor 65 to be conductive and N-channel transistor 66 to be substantially non-conductive, driving a logic high output signal P7 to I/O terminal 67. Bit 7 of pull-down register bit field 81 is a logic low, causing N-channel transistor 70 to be substantially non-conductive.

If I/O port circuit 55 is configured as an input port, tristate control signal TRISTATE CONTROL 7 is a logic low, bit 7 of select register bit field 60 is a logic low. The logic low tristate control signal TRISTATE CONTROL 7 causes buffer circuit 64 to be disabled and P-channel transistor 65 and N-channel transistor 66 are substantially non-conductive. Bit 7 of pull-down register bit field 81 is a logic low, and N-channel transistor 70 is non-conductive. Bit 7 of direction control register bit field 59 is a logic low causing bit 7 of data register bit field 58 to be in a write mode. A logic state of a data signal provided to I/O terminal 67 is written into bit 7 of data register bit field 58.

At start up, or during reset, if I/O terminal 67 of I/O port circuit 55 is to be a logic low, at least initially, bit 7 of select register bit field 60 is a logic low, and tristate control signal TRISTATE CONTROL 7 is asserted as a logic low. Enable signal ENABLE 7 is provided by multiplexer 63 to disable buffer circuit 64. Both P-channel transistors 65 and N-channel transistor 66 are substantially non-conductive. Bit 7 of pull-down register bit field 81 is a logic high, causing N-channel transistor 70 to be conductive, a current through resistive element 69 reduces a voltage at I/O terminal 67 to a logic low voltage.

For I/O terminal 77 to be reset as a logic high, bit 0 of select register bit field 60 is a logic low, and tristate control signal TRISTATE CONTROL 0is asserted as a logic low. Enable signal ENABLE 0is provided by multiplexer 73 to disable buffer circuit 74. Both of P-channel transistor 75 and N-channel transistor 76 are substantially non-conductive.

Bit 0 of pull-up register bit field 82 is a logic low, causing P-channel transistor 80 to be conductive, and a current through resistive element 79 increases a voltage at I/O terminal 77 to a logic high voltage.

The multi-function, scalable, I/O port effectively increases the number of parallel I/O terminals without increasing the number of pins on a package containing the data processing system. Also, the multi-function, scalable, I/O port reclaims the use of pins for other functions that were previously only used at startup or reset. In addition, power consumption is reduced because the external load resistors are eliminated.

While the invention has been described in the context of a preferred embodiment, it will be apparent to those skilled in the art that the present invention may be modified in numerous ways and may assume many embodiments other than that specifically set out and described above. For example I/O port 44 may be configured so as to multiplex more than two functions by adding additional control bits and multiplexer inputs. Accordingly, it is intended by the appended claims to cover all modifications of the invention which fall within the true spirit and scope of the invention.

What is claimed is:

1. A data processing system implemented on a single integrated circuit, the data processing system having a multi-function input/output port, the multi-function input/output port comprising a plurality of input/output port circuits, each of the plurality of input/output port circuits comprising:

a multiplexer having a first input terminal for receiving a first data signal, a second input terminal for receiving a second data signal, a control terminal for receiving a select signal, and an output terminal;

a buffer circuit having an input terminal coupled to the output terminal of the multiplexer, a control terminal for receiving an enable signal, and an output terminal, the buffer circuit controlling a pull-up transistor for increasing a voltage at an output terminal of the buffer circuit, and controlling a pull-down transistor for reducing the voltage at output terminal of the buffer circuit;

an input/output terminal coupled to the output terminal of the buffer circuit, for providing the first or second data signals external to the data processing system;

a pull-up circuit, coupled to the input/output terminal, for increasing the voltage at the input/output terminal in response to a pull-up control signal; and a register bit field having a plurality of programmable bits, a bit of the plurality of programmable bits corresponding to one input/output port circuit of the plurality of input/output port circuits, each of the plurality of programmable bits for selectively providing the pull-up control signal to the corresponding pull-up circuit of each of the plurality of input/output port circuits;

wherein use of the pull-up circuit and register bit field allow the voltage at the output terminal of each, of the plurality of input/output port circuits to be increased without using load resistors that are external to the data processing system.

2. A data processing system as in claim 1, wherein the pull-up circuit comprises a transistor having a first current electrode coupled to a power supply voltage terminal, a control electrode for receiving the pull-up control signal, and a second current electrode coupled to the input/output terminal.

3. A data processing system as in claim 1, further comprising means for tristating the input/output port circuit.

4. A data processing system as in claim 1, further comprising a second multiplexer having a first input terminal for receiving a tristate control signal, a second input terminal for receiving a control signal, and an output terminal coupled to a control terminal of the buffer circuit.

5. A data processing system as in claim 4, further comprising a direction register having a direction bit field, each bit of the direction bit field having an input terminal coupled to a bus for receiving a direction control signal, and an output terminal coupled to the second input terminal of the second multiplexer.

6. A data processing system as in claim 1, further comprising a data register having a data bit field, each bit of the data bit field having an output terminal coupled to a corresponding one of the second input terminals of the plurality of input/output port circuits, a first input terminal coupled to a bus, and a second input terminal coupled to the input/output terminal.

7. A data processing system implemented on a single integrated circuit, the data processing system having a multi-function input/output port, the multi-function input/output port comprising a plurality of input/output port circuits, each of the plurality of input/output port circuits comprising:

a multiplexer having a first input terminal for receiving a first data signal, a second input terminal for receiving a second data signal, a control terminal for receiving a select signal, and an output terminal;

a buffer circuit having an input terminal coupled to the output terminal of the multiplexer, a control terminal for receiving an enable signal, and an output terminal, the buffer circuit controlling a pull-up transistor for increasing a voltage at an output terminal of the buffer circuit, and controlling a pull-down transistor for reducing the voltage at the output terminal of the buffer circuit;

an input/output terminal coupled to the output terminal of the buffer circuit, for providing the first or second data signals external to the data process system;

a pull-down circuit, coupled to the input/output terminal, for reducing the voltage at the input/output terminal in response to a pull-down control signal; and a register bit field having a plurality of programmable bits, a bit of the plurality of programmable bits corresponding to one input/output port circuit of the plurality of input/output port circuits, each of the plurality of programmable bits for selectively providing the pull-down control signal to the corresponding pull-down circuit of each of the plurality of input/output port circuits;

wherein use of the pull-down circuit and register bit field allow the voltage at the output terminal of each of the plurality of input/output port circuits to be reduced without using load resistors that external to the data processing system.

8. A data processing system as in claim 7, wherein the pull-down circuit comprises a transistor having a first current electrode coupled to the input/output terminal, a control electrode for receiving the pull-down control signal, and a second current electrode coupled to a power supply voltage terminal.

9. A data processing system as in claim 7, further comprising means for tristating the input/output port circuit.

10. A data processing system as in claim 7, further comprising a second multiplexer having a first input terminal for receiving a tristate control signal, a second input terminal for receiving a control signal, and an output terminal coupled to a control terminal of the buffer circuit.

11. A data processing system as in claim 10, further comprising a direction register having a direction bit field, each bit of the direction bit field having an input terminal coupled to a bus for receiving a direction control signal, and an output terminal coupled to the second input terminal of the second multiplexer.

12. A data processing system as in claim 7, further comprising a data register having a data bit field, each bit of the data bit field having an output terminal coupled to a corresponding one of the second input terminals of the multiplexers of the plurality of input/output port circuits, a first input terminal of the data register coupled to a bus, and a second input terminal of the data register coupled to the input/output terminal.

13. A data processing system implemented on a single integrated circuit, the data processing system having a multi-function, scalable, input/output port, the multi-function input/output port comprising a plurality of input/output port circuits, each input/output port circuit comprising:

- a first multiplexer having a first input terminal for receiving a first data signal, a second input terminal for receiving a second data signal, a control terminal for receiving a select signal, and an output terminal;
- a second multiplexer having a first input terminal for receiving a tristate control signal, a second input terminal coupled to a direction register bit field, a control terminal for receiving the select signal, and an output terminal for providing an enable signal;
- a buffer circuit having an input terminal coupled to the output terminal of the first multiplexer, a control terminal coupled to the output terminal of the second multiplexer for receiving the enable signal, and an output terminal, the buffer circuit controlling a pull-up transistor for increasing a voltage at the output terminal and controlling a pull-down transistor for reducing the voltage at the output terminal;
- an input/output terminal coupled to the output terminal of the buffer circuit, for providing the first or second data signals external to the data processing system;
- a reset/startup circuit, coupled to the input/output terminal, for setting the voltage at the input/output terminal to a predetermined logic state in response to a reset/startup control signal; and
- a register bit field having plurality of programmable bits, a bit of the plurality of programmable bits corresponding to one input/output port circuit of the plurality of input/output port circuits, each of the plurality of programmable bits for selectively providing the pull-up control signal to the corresponding reset/startup circuit of each of ithe plurality of input/output port circuits;
- wherein use of the reset/startup circuit and register bit field allow the voltage at the output terminal of each of the plurality of input/output port circuits to be set to the predetermined logic state during reset or startup of the data processing system without using load resistors that are external to the data processing system.

14. A data processing system as in claim 13, further comprising a data register having a data bit field, each bit of the data bit field having an output terminal coupled to a corresponding one of the second input terminals of the first multiplexers of the plurality of input/output port circuits, a first input terminal of the data register coupled to a bus, and a second input terminal of the data register coupled to the input/output terminal.

15. A data processing system as in claim 13, further comprising a direction register having a direction bit field, each bit of the direction bit field having an input terminal coupled to a bus for receiving a direction control signal, and an output terminal coupled to the second input terminal of the second multiplexer.

16. A data processing system as in claim 13, wherein the reset/startup circuit comprises a pull-down circuit, the pull-down circuit comprising a transistor having a first current electrode coupled to the input/output terminal, a control electrode for receiving a pull-down control signal, and a second current electrode coupled to a power supply voltage terminal.

17. A data processing system as in claim 13, wherein the reset/startup circuit comprises a pull-up circuit, the pull-up circuit comprising a transistor having a first current electrode coupled to a power supply voltage terminal, a control electrode for receiving the pull-down control signal, and a second current electrode coupled to the input/output terminal.

* * * * *